Figure 1:
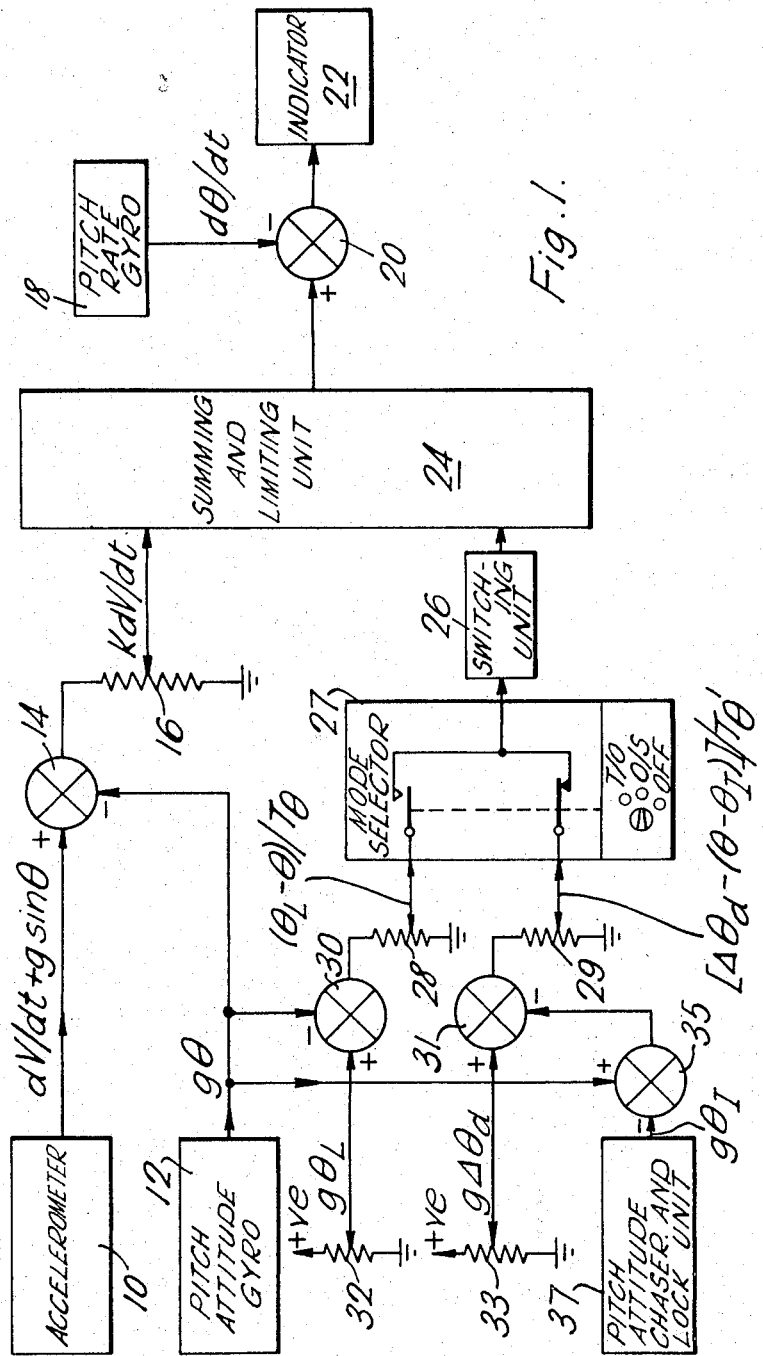

United States Patent Office 3,359,793
Patented Dec. 26, 1967

---

3,359,793
AIRCRAFT INSTRUMENTS
Eric R. Kendall and Stanley B. Newport, Cheltenham, England, assignors to S. Smith & Sons (England) Limited, London, England, a British company
Filed Nov. 27, 1964, Ser. No. 414,368
Claims priority, application Great Britain, Nov. 28, 1963, 47,122/63
19 Claims. (Cl. 73—178)

This invention relates to aircraft instruments. In co-pending U.S. patent application Serial No. 326,654, filed November 18, 1963, in the names of R. I. Bishop, E. R. Kendall, and R. A. Palmer, now U.S. Patent No. 3,309,923 issued March 21, 1967, for "Aircraft Instruments," there is described a form of aircraft instrument which according to one aspect, comprises means for providing a signal dependent upon forward acceleration of the aircraft, means for providing a signal dependent upon rate of change of pitch attitude of the aircraft, and means which is arranged to be responsive to both signals for providing an indication which is dependent upon differences between said rate of change of pitch attitude and a function dependent upon said acceleration such that said indication is indicative of at least the sense of said difference. An aircraft instrument of the general form specified in the preceding sentence will be referred to hereinafter for convenience as "of the kind specified."

The above-mentioned application contains a description of one specific form of aircraft instrument of the kind specified, in which said function dependent upon the forward acceleration of the aircraft is simply the product of the forward acceleration and a constant, the instrument as a result providing an indication of pitch rate in accordance with the equation:

$$d\theta/dt = K dV/dt \qquad (1)$$

where $\theta$ is the pitch attitude of the aircraft
$V$ is the forward velocity of the aircraft
$K$ is a constant, and
$t$ is time, $d\theta/dt$ and $dV/dt$ being respectively the rate of change of pitch attitude and forward acceleration of the aircraft.

It has been found that if Equation 1 is used as a director law during take-off, that is to say if the rate of change of pitch of the aircraft is maintained in constant proportion to the acceleration along the flight path during take-off, a flight path which satisfies broadly safety and operational requirements is achieved. The equation has, in particular, been assessed by calculations covering variations in factors such as the total, all-up weight of the aircraft at take-off and the available propulsive thrust. In respect of calculations relating to one particular multi-engine transport aircraft, for example, consideration has been given to each of the combinations of circumstances that arise when total weight is 100,000 lbs or 160.000 lbs and when all engines or all engines except one are operative. With each case the equation gives a satisfactory flight path with a satisfactory forward speed, a satisfactory margin to stall, and a satisfactory acceleration increment normal to the flight path, when a value of 0.003 or 0.004 is used for the constant K, the rate $d\theta/dt$ being in these circumstances expressed in radians per second and the acceleration $dV/dt$ in feet per second per second. Better speeds and speed margins are obtained, at the expense of lower flight paths, with the value 0.003 rather than 0.004 for the constant K. A lower value than 0.003 for the constant K gives an unduly low flight path under the conditions in which one engine is inoperative, and the total weight is 160,000 lbs, whilst under these conditions a higher value than 0.004 does not allow enough speed margin. The acceptable range for the constant K in the case of this one particular aircraft is thus established, and can equally well be established for other aircraft.

Co-pending U.S. patent application Serial No. 361,-404, filed April 21, 1964 in the names of E. R. Kendall and S. B. Newport, now U.S. Patent No. 3,321,967 issued May 30, 1967, for "Aircraft Instruments," contains a description of another specific form of aircraft instrument of the kind specified, the director law in this case including terms dependent, among other things, upon a desired pitch attitude for lift-off and a desired velocity for climb-out, as well as a term dependent upon aircraft acceleration along the flight path.

The various forms of aircraft instrument described in the above-mentioned patent applications, and also in co-pending U.S. patent application Serial No. 367,595 filed May 14, 1964, in the names of R. I. Bishop, E. R. Kendall, and R. A. Palmer, now U.S. Patent No. 3,283,573 issued November 8, 1966, for "Aircraft Instruments," are intended primarily for use during take-off manoeuvres, but it has been appreciated that such instruments can be used to assist the pilot during other manoeuvres. One particular manoeuvre that has received consideration in this respect is that of overshoot (that is to say, the manoeuvre which is initiated when an approach to a landing is abandoned), and it is an object of the present invention to provide an aircraft instrument of the kind specified which is especially adapted to assist a pilot in achieving an acceptable flight path for the overshoot manoeuvre.

According to one aspect of the present invention, in an aircraft instrument of the kind specified, it is arranged that said function is also dependent upon the extent to which change in pitch attitude of the aircraft differs from a predetermined value, the arrangement being such that reduction in the difference between the value of said change and said predetermined value tends to reduce said difference between rate of change of pitch attitude and said function.

The instrument may be such that the said function is dependent upon the extent to which change in pitch attitude differs from the predetermined value, only until the predetermined value of pitch change has been achieved. Furthermore, it may be arranged that the said function is dependent upon the extent to which the aircraft velocity along its flight path differs from a predetermined value. This latter value may be, for example, the velocity to be attained for the steady climb-out phase of an overshoot manoeuvre.

According to another aspect of the present invention, an aircraft instrument comprises means for providing a first signal dependent upon forward acceleration of the aircraft, means for providing a second signal dependent upon rate of change of pitch attitude of the aircraft, means for providing a third signal dependent upon the extent to which change in pitch attitude of the aircraft differs from a predetermined value, and means responsive to the first, second, and third signals to provide a fourth signal in accordance with difference between said rate of change of pitch attitude and a function that is dependent upon both said forward acceleration and the extent by which the change in pitch attitude differs from said predetermined value.

The said fourth signal may be used to provide an indication of the magnitude and sense of the difference between the rate of change of pitch attitude and said function, however, it may alternatively be used in more complex arrangements. For example, in the event that fully- or semi-automatic landing facilities are provided, the signal may be used more directly in the control of the aircraft.

An aircraft instrument in accordance with the present invention will now be described, by way of example, with reference to the accompanying drawings, in which:

FIGURE 1 shows the instrument in schematic form; and

Figure 2:
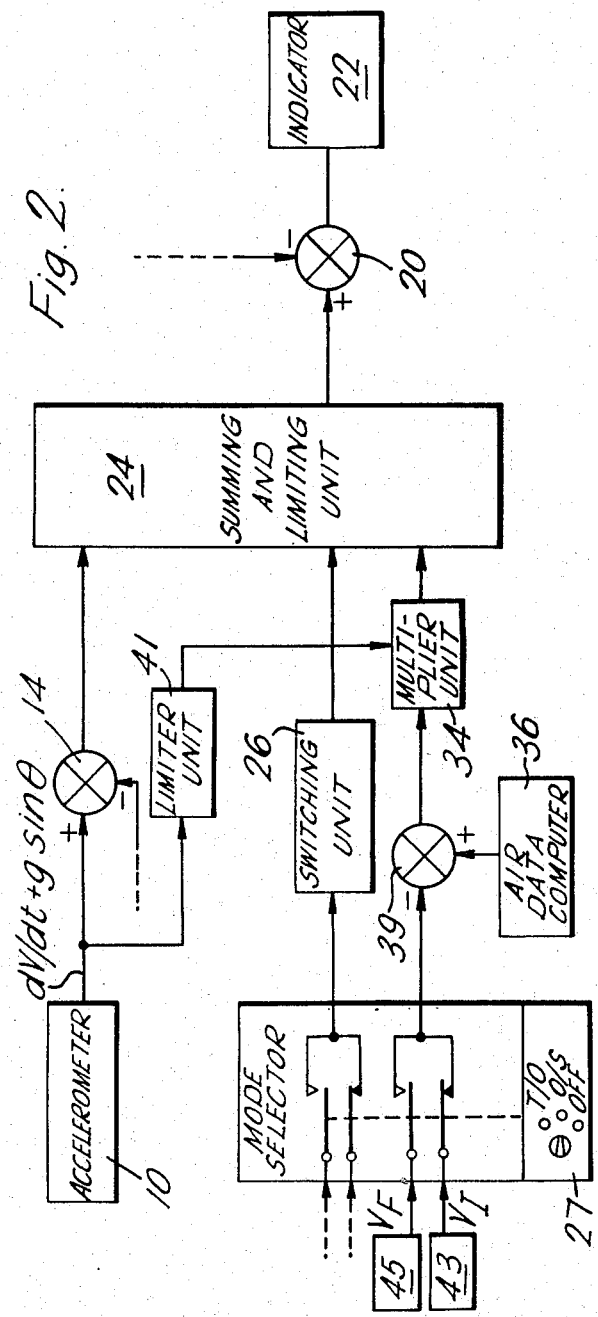

FIGURE 2 serves to illustrate a modification of the instrument of FIGURE 1.

Referring to FIGURE 1, an accelerometer 10, which may be in the form of a pendulum mounted for angular displacement about an axis parallel to the pitch axis of the aircraft, supplies an electric signal dependent in amplitude upon the forward acceleration $dV/dt$ of the aircraft. The signal supplied by the accelerometer 10 is in fact representative of $(dV/dt+g \sin \theta)$, where $g \sin \theta$ is in this case an unwanted gravitational component which is inherently measured by the accelerometer 10. The gravitational component for small values of pitch angle $\theta$ is approximately equal to $g\theta$, and in order to remove this unwanted component a signal representative of $g\theta$ is derived from a pitch attitude gyro 12 and combined in a differential device 14 with the signal from the accelerometer 10.

The differential device 14 derives in response to the signals it receives from the accelerometer 10 and gyro 12 a signal which is representative in amplitude of the forward acceleration $dV/dt$, and which is substantially independent of the unwanted gravitational component $g \sin \theta$. This signal representative of the acceleration $dV/dt$ is applied across a potentiometer 16 so as to derive from the movable tap of the potentiometer 16 a signal representative of the function $KdV/dt$, the value of the constant K being dependent upon the setting of the tap.

The instrument also includes a pitch rate gyro 18 which supplies a signal representative of the rate of change of pitch $d\theta/dt$, of the aircraft, and as far as the instrument shown in FIGURE 1 has so far been described, it is the same as the basic instrument described in co-pending U.S. patent application Ser. No. 326,654. However, in the latter instrument the signals derived from the potentiometer 16 and the pitch rate gyro 18 are supplied to a differential device 20 to derive a signal representative of:

$$KdV/dt - d\theta/dt$$

Which signal is then supplied to an indicator 22 (for example, a centre-zero meter) which indicates sense, and preferably the magnitude also, of the above expression. With the present instrument this is not the case; the signal derived from the potentiometer 16 is supplied to a "summing and limiting" unit 24 together with a signal supplied via a switching unit 26, and the signal from the pitch rate gyro 18 is supplied to the differential device 20 together with an output signal of the unit 24.

The signal supplied to the summing and limiting unit 24 via the switching unit 26 is, according to the setting of a mode selector 27, representative of:

$$(\theta_L - \theta)/T_0 \tag{2}$$

$$\{\Delta\theta_d - (\theta - \theta)\}/T_0' \tag{3}$$

where $\theta_L$ is a predetermined value of pitch angle $\theta$ required for lift-off of the aircraft during a take-off manoeuvre $\Delta\theta_d$ is a predetermined change in pitch angle $\theta$ required of the aircraft during an overshoot manoeuvre $\theta_I$ is the value of pitch angle $\theta$ which obtains initially when the overshoot mode is selected, and $T_0$ and $T_0'$ are constants which each have the dimension of time and which are applicable to the take-off and overshoot modes respectively.

The mode selector 27 is supplied with signals representative respectively of Expressions 2 and 3, and is arranged to supply the signal representative of Expression 2 to the switching unit 26 when the take-off mode has been selected by the pilot, and to supply the signal representative of Expression 3 when the overshoot mode has been selected. In addition, the selector 27 may be switched to an "off" position in which neither signal is supplied, the instrument then acting in substantially the same manner as the basic instrument described in co-pending U.S. patent application Serial No. 326,654.

The setting of the mode selector 27 for operation in the overshoot mode, but no other, requires two actions, a first the setting of a manual control to indicate the choice of the overshoot mode, and the second the depression of a button readily available to the pilot. The setting of the manual control to indicate choice of the overshoot mode does nothing more than prime the system ready for operation in the overshoot mode, the actual selection or engagement of the mode being achieved by subsequent depression of the button. This arrangement, which will not be described in any greater detail in this specification, enables the pilot to prime the system prior to making a landing manoeuvre and achieve rapid engagement of the system in the overshoot mode if this becomes necessary at any stage of the manoeuvre.

A signal representative of Expression 2 is supplied to the mode selector 27 from the movable tap of a potentiometer 28, the potentiometer 28 being supplied with a signal representative of $g(\theta_L - \theta)$ derived by a differential device 30. The differential device 30 receives two signals one of which is representative of $g\theta_L$ and is received from a potentiometer 32 that is set (for example by the pilot) in accordance with the desired pitch angle for lift-off. The other signal received by the differential device 30 is representative of $g\theta$ and is derived from the signal supplied by the pitch attitude gyro 12. As an alternative however, the signal representative of $g\theta$ may be derived by an integrator (not shown) from the signal representative of pitch rate $d\theta/dt$ supplied by the pitch rate gyro 18.

A signal representative of Expression 3 is supplied to the mode selector 27 from the movable tap of a potentiometer 29, the potentiometer 29 being supplied with a signal representative of:

$$g\Delta\theta_d - g(\theta - \theta_I)$$

that is derived by a differential device 31 in accordance with two signals. One of these two signals is representative of $g\Delta\theta_d$ and is received from a potentiometer 33 that is set in accordance with the value of pitch change $\Delta\theta_d$, required to be made during the overshoot manoeuvre. The other signal received by the differential device 31 is representative of $g(\theta - \theta_I)$ and is derived from a differential device 35 that receives, together with the signal representative of $g\theta$ supplied by the attitude gyro 12, a signal representative of $g\theta_I$ supplied by a unit 37. The unit 37, termed a "pitch attitude chaser and lock unit," is arranged to provide a measure of the instantaneous pitch angle $\theta$ of the aircraft which obtains when the overshoot mode is selected by operation of the mode selector 27. While the mode selector 27 is set to select the take-off mode, or is set to the "off" position, there is provided within the unit 37 a signal which varies in accordance with the instantaneous value of the pitch angle $\theta$. When however, the selector 27 is operated to set it to select the overshoot mode, the signal is, so to speak, frozen at the particular value $\theta_I$, of the pitch angle $\theta$ that then obtains, and this situation continues until the adoption of another setting of the selector 27. (The means in the unit 37 which is responsive to pitch angle $\theta$ of the aircraft and to the setting of the selector 27 is not shown in FIGURE 1).

When the mode selector 27 is set to select the overshoot mode (as shown), the signal supplied via the selector 27 to the switching unit 26, having an amplitude representative of Expression 3, is dependent upon the extent to which the instantaneous pitch angle $\theta$ of the aircraft has still to be changed in order to achieve the required pitch change $\Delta\theta_d$ from the pitch angle $\theta_I$ subsisting when the overshoot mode was selected. When, on the other hand, the mode selector 27 is set to select the take-off mode, the signal supplied via the selector 27 to the switching unit 26, having an amplitude representative of Expression 2, is dependent upon the extent to which the instantaneous pitch angle $\theta$ of the aircraft falls short of the angle $\theta_L$ required for lift-off.

The switching unit 26 supplies whichever signal it receives from the selector 27 to the unit 24, and is arranged to be responsive to the condition in which the amplitude of the signal supplied first becomes, or approaches, zero to break the further supply of the signal to the unit 24. Thus once the desired pitch change $\Delta\theta_d$ or pitch angle $\theta_L$, as the case may be, has been achieved, the signal supplied by the selector 27 is no longer effective in the instrument.

The summing and limiting unit 24 supplies to the differential device 20 a signal which is representative in magnitude and sense of the sum of the signals it receives. The signal which is in consequence supplied by the differential device 20 to the indicator 22 is representative of the difference between the "sum" signal it receives from the unit 24 and the pitch rate signal it receives from the gyro 18. Thus, when the overshoot mode is selected, and until the required pitch change $\Delta\theta_d$ is achieved, the indicator 22 is operated according to the director law:

$$d\theta/dt = KdV/dt + \{\Delta\theta_d - (\theta - \theta_I)\}/T_o' \qquad (4)$$

When, however, the take-off mode is selected, and until the pitch angle $\theta_L$ required for lift-off is first achieved, the indicator 22 is operated according to the director law:

$$d\theta/dt = KaV/dt + (\theta_L - \theta)/T_o \qquad (5)$$

In either mode, once the required pitch change $\Delta\theta_d$ or the required lift-off angle $\theta_L$, as the case may be, has been achieved, the director law applicable is the basic law of Equation 1.

The unit 24, in addition to its summing function, performs a limiting function in that it limits the amplitude of the signal supplied to the differential device 20 to a value corresponding to a predetermined maximum pitch rate demand, for example, of 3 degrees per second.

When the instrument is used in the take-off mode it provides guidance to the pilot from the beginning of the rotation phase (that is to say, from the beginning of the final phase of the ground run during which the pitch attitude of the aircraft is changed rapidly to that required for lift-off), through the flare-up (normally a substantially exponential flare-up) phase, and during the climb-out phase (that is to say, during the phase in which the aircraft is to climb at a substantially steady rate and angle). During the rotation phase, the indication provided by the indicator 22 is indicative in magnitude and sense of the pitch rate $d\theta/dt$ which is required to comply with the director law of Equation 5. The component dependent upon $(\theta_L - \theta)$ added to the basic component dependent upon the forward acceleration $dV/dt$, ensures that the pitch-rate demand can fall to zero only by the achievement of the lift-off pitch angle $\theta_L$. The higher rate of change of pitch angle implied by this added component is acceptable during the rotation phase since the aircraft has not then left the ground. As soon as the lift-off pitch angle $\theta_L$ has been achieved, the resultant operation of the switching unit 26 causes the instrument to act in accordance with the director law of Equation 1 for the subsequent flare-up and climb-out phases.

Before an approach to a landing is made, the mode selector 27 is set to prime the system ready for operation in the overshoot mode. If during the approach the pilot decides to abandon the manoeuvre he depresses the button available to him to effect selection of the overshoot mode. As soon as the overshoot mode is selected the indication provided by the indicator 22 demands pitch rate in accordance with the director law of Equation 4. The component dependent upon the Expression 3 ensures that the pitch-rate demand can fall to zero only by the achievement of the predetermined change in pitch angle, $\Delta\theta_d$. This component ensures that there is the required rapid and definite change in pitch attitude necessary once the decision to execute an overshoot manoeuvre has been made. As soon as the pitch angle change $\Delta\theta_d$ has been achieved, the resultant operation of the switching unit 26 causes the instrument to act in accordance with the director law of Equation 1 to attain a steady climb-out at the end of the manoeuvre.

It may be found preferable to ensure that the aircraft attains some predetermined final velocity for the climb-out phase of the overshoot manoeuvre. In this case the instrument of FIGURE 1 may be modified as illustrated in FIGURE 2. Only those parts of the instrument of FIGURE 1 which are necessary for the understanding of the modification are shown in FIGURE 2.

Referring to FIGURE 2, a third signal is in this case supplied to the unit 24 from a multiplier unit 34 which receives signals from a differential device 39, and a limiter unit 41. The signal supplied by the differential device 39 is derived from two signals, one signal being dependent upon the instantaneous forward velocity V of the aircraft and being supplied by an air data computer 36, and the other being supplied, according to the setting of the mode selector 27, from a unit 43 or a unit 45. The signal derived by the unit 43 is used in the event that the selector 27 is set to the overshoot mode, such signal being dependent upon the instantaneous value, $V_I$, of forward velocity V which obtains when the selector 27 is operated to select the overshoot mode. While the selector 27 is set to select the take-off mode, or is set to the "off" position, there is provided within the unit 43 a signal which varies in accordance with the instantaneous value of the velocity V. When however, the selector 27 is operated to select the overshoot mode, the signal is frozen at the particular value, $V_I$, of forward velocity which then obtains, and this situation continues until the adoption of another setting of the selector 27. (The means responsive in the unit 43 to forward velocity V and to the setting of the selector 27 is not shown in FIGURE 2.)

When the mode selector 27 is set to select the take-off mode it is the signal derived by the unit 45, rather than the unit 43, which is applied to the differential device 39. The unit 45 has a control (not shown) which is set in accordance with the desired value $V_F$ of forward velocity required to be attained for the climb-out phase of the take-off manoeuvre. As in the case of the instrument described, with reference to FIGURES 1 to 3, in co-pending U.S. patent application Serial No. 361,404, the value of $V_F$ may be made dependent upon the velocity $V_R$ at which the rotation phase of take-off is selected to occur.

Whichever of the two signals supplied by the units 43 and 45 is selected by the mode selector 27, the signal derived by the differential device 39 is passed to the unit 24 as in effect multiplied in the multiplier unit 34 by a signal supplied by the limiter unit 41. In this respect, the limiter unit 41 is responsive to the signal derived by the accelerometer 10 to supply this signal to the multiplier unit 34 only when the represented acceleration is greater than some predetermined minimum value (for example zero). When the represented acceleration is less than the said predetermined minimum value the signal supplied to the multiplier unit 34 is representative of this latter value.

When the signal derived by the differential device 39 is passed to the unit 24 and the mode selector 27 is set to select the overshoot mode (as shown) the director law is:

$$d\theta/dt = K\{dV/dt + \bar{a}(V-V_I)/T_V'\} + \{\Delta\theta_d - (\theta - \theta_I)\}/T_o'$$

until the pitch change $\Delta\theta_d$ has been achieved, and thereafter is:

$$d\theta/dt = K\{dV/dt + \bar{a}(V-V_I)/T_V'\}$$

where $T_V'$ is a constant, and $a$ is the value of acceleration represented by the output signal of the limiter 41, which output signal is the same as that supplied by the accelerometer 10 so long as the represented acceleration is not less than said predetermined minimum value, but otherwise is representative of this latter value.

When the mode selector 27 is set to select the take-off mode the director law is:

$$d\theta/dt = K\{dV/dt + \bar{a}(V - V_F)/T_V\} + (\theta_L - \theta)T_\theta$$

until the pitch attitude $\theta_L$ for lift-off has been achieved, and thereafter is:

$$d\theta/dt = K\{dV/dt + \bar{a}(V - V_F)/T_V\}$$

The added component, dependent in the overshoot mode upon the difference $(V - V_I)$ and in the take-off mode upon the difference $(V - V_F)$, ensures in each case that a demand for pitch rate is provided by the indicator 22 until the relevant velocity, $V_I$ or $V_F$, is obtained.

The indicator 22 is preferably an indicator of the general kind described in British patent specification No. 853,034, but may be a centre-zero meter of conventional form. In the former case, the indicator may be specifically as described in British patent specification No. 886,136, and include a cylindrical member which is mounted for rotation about its longitudinal axis and which carries an optically distinct helical band coaxial therewith, the member being rotated by a servo system at a rate and in a sense dependent upon the magnitude and sense respectively of the signal supplied to device 20, so that the helical band provides an optical effect of movement at a rate and in a sense dependent upon the relevant director law. When this indicator is used, the pilot controls the aircraft in pitch to maintain the condition in which the cylindrical member does not rotate, thereby to comply with the director law. It may be arranged that the cylindrical member is obscured from view, for example by means of a shutter, until the rotation velocity $V_R$, referred to above, has been achieved during take-off.

The instrument described above may be further modified so that instead of using the signals supplied by the attitude gyro 12 and unit 37 for computing $(\theta - \theta_I)$, the pitch attitude change which has taken place since the start of the overshoot mode of operation is derived by integrating with respect to time the pitch rate signal $d\theta/dt$ provided by the gyro 18 from the instant of selection of the overshoot mode. In addition, it may be desirable to control the operation of the switching unit 26 in a more complex method than that described above. For example it may be desirable to arrange that the switching unit 26 breaks the supply of signals to the unit 24 when either: (i) $\Delta\theta_d - (\theta - \theta_I) = 0$ or (ii) $dV/dt$ is less than a predetermined value and there has been more than some predetermined minimum pitch change.

Condition (ii) implies that, provided there has been the predetermined minimum pitch change, the supply of signals to the unit 24 via the switching unit 26 is broken when the forward acceleration falls below the predetermined value.

Although in the instrument described above the overshoot mode is selected manually only, provision may be made to ensure that this mode is selected automatically if the throttles of the aircraft are opened fully during approach to a landing. Furthermore, it may be necessary where the overshoot mode is initiated after the beginning of the flare phase of landing to provide that the value $\theta_I$ (and where it is used, the value $V_I$) is frozen at the value appropriate to the commencement of the flare phase. With a conventional autoflare system a radio altimeter is available to provide a signal for achieving this, but in any case a suitable signal may be obtained from a barometric pressure sensor.

With the above instrument, taking the pitch rate as measured by the pitch rate gyro 18, it is assumed that the aircraft is in the wings-level attitude throughout take-off and overshoot. Where, however, the wings-level attitude is not maintained, it may be found advantageous to modify the instrument so as to ensure that the measure of pitch rate $d\theta/dt$ is appropriately related to gravity axes. This may be done in a variety of ways. For example, a measure of pitch rate $d\theta/dt$ with reference to gravity axes may be derived using a measure of the roll angle $\phi$ of the aircraft together with measures of the angular velocities $q$ and $r$ of the aircraft about its pitch and yaw axes respectively, the pitch rate $d\theta/dt$ in these circumstances being computed as $(q \cos \phi - r \sin \phi)$. Alternatively, the pitch rate $d\theta/dt$ may be derived as the differential of the pitch angle $\theta$ measured, for example, by the pitch attitude gyro 12. In this latter case however, it may be found that the noise-level of the signal which provides the measure of angle $\theta$ is too high for satisfactory derivation of the measure of pitch rate $d\theta/dt$, and it may be preferable to combine differentiation of pitch attitude $(\theta)$ and pitch rate $(q)$ signals using complementary filtering techniques. The measure of pitch rate $d\theta/dt$ used in these latter circumstances may be computed as:

$$\{D/(1+\tau_1 D)\}\{\theta + \tau_2 q\}$$

where $\tau_1$ and $\tau_2$, which may be equal to one another, are time constants, and D is the differential operator representative of differentiation with respect to time.

We claim:

1. An aircraft instrument comprising means for providing a first signal dependent upon forward acceleration of the aircraft, means for providing a second signal dependent upon rate of change of pitch attitude of the aircraft, means for providing a third signal dependent upon the extent to which change in pitch attitude of the aircraft differs from a predetermined value, and means responsive to the first, second, and third signals to provide an indication of at least the sense of difference between said rate of change of pitch attitude and a function that is dependent upon both said forward acceleration and the extent by which the change in pitch attitude differs from said predetermined value.

2. An aircraft instrument according to claim 1 wherein the means for providing said third signal comprises means for providing a signal in accordance with any difference between the current value of pitch attitude of the aircraft and the value of pitch attitude that obtained at a predetermined earlier instant, and means arranged to provide in accordance with the latter signal a signal dependent upon the extent to which this difference differs from said predetermined value of pitch change.

3. An aircraft instrument according to claim 1 wherein said function is dependent upon the extent to which the change in pitch attitude differs from said predetermined value, only until said predetermined value of pitch change has been achieved.

4. An aircraft instrument according to claim 1 including means for providing a fourth signal dependent upon the extent to which the forward velocity of the aircraft differs from a predetermined value of forward velocity, and wherein said means responsive to the first, second, and third signals is also responsive to said fourth signal, and said function is also dependent upon the extent to which the forward velocity of the aircraft differs from said predetermined value of forward velocity.

5. An aircraft instrument according to claim 4 wherein said predetermined value of forward velocity is a value that obtained at a predetermined earlier instant.

6. An aircraft instrument according to claim 1 wherein said function is the algebraic sum of at least two terms, a first of the two terms being proportional to said forward acceleration and the second of the two terms being proportional to the extent to which the change in pitch attitude differs from said predetermined value.

7. An aircraft instrument according to claim 6 including means for providing a signal dependent upon the extent to which change in pitch attitude of the aircraft differs from said predetermined value of pitch change, means for providing in accordance with this latter signal and said signal dependent upon forward acceleration a signal dependent upon said sum as limited in value to a predetermined upper limit, and means for providing a signal representative of the difference between the sum limited as aforesaid, and said rate of change of pitch attitude.

8. An aircraft instrument according to claim 6 wherein said second term is effective in said function selectively.

9. An aircraft instrument according to claim 8 wherein a term dependent upon the extent to which the pitch attitude of the aircraft differs from a predetermined value of pitch attitude is effective in said function selectively and alternatively with said second term.

10. An aircraft instrument according to claim 9 wherein said term dependent upon the extent to which the pitch attitude of the aircraft differs from a predetermined value of pitch attitude, when effective in said function, is effective only until said predetermined value of pitch attitude is attained.

11. An aircraft instrument comprising means for providing a first signal dependent upon forward acceleration of the aircraft, means for providing a second signal dependent upon rate of change of pitch attitude of the aircraft, means for providing a third signal dependent upon the extent to which change in pitch attitude of the aircraft differs from a predetermined value, and means responsive to the first, second, and third signals to provide a fourth signal in accordance with difference between said rate of change of pitch attitude and a function that is dependent upon both said forward acceleration and the extent by which the change in pitch attitude differs from said predetermined value.

12. An aircraft instrument according to claim 11 including an indicator for providing in accordance with the fourth signal an indication of the magnitude and sense of the difference between said rate of change of pitch attitude and said function.

13. An aircraft instrument according to claim 12 wherein said indicator comprises a rotatable member, and means for rotating said rotatable member at a rate and in a sense dependent upon the magnitude and sense respectively of said difference between the rate of change of pitch attitude and said function.

14. An aircraft instrument according to claim 13 wherein said rotatable member is a cylindrical member mounted for rotation about its longitudinal axis and having an optically distinct helical band coaxial therewith for providing an optical effect of movement at a rate and in a sense dependent respectively upon the rate and sense of rotation of the cylindrical member.

15. An aircraft instrument according to claim 11 wherein said means for providing said first signal includes an accelerometer.

16. An aircraft instrument according to claim 11 wherein the means for providing said first signal comprises an accelerometer arranged to supply a signal which has a first component dependent upon said acceleration and, inherently, a second component dependent both upon gravity and the pitch attitude of the aircraft, a pitch attitude unit for supplying a signal dependent upon the pitch attitude, and means arranged to be responsive to the signals supplied by the accelerometer and the pitch attitude unit to supply a signal which is dependent upon said first component but substantially independent of said second component of the accelerometer signal.

17. An aircraft instrument according to claim 11 wherein the means for providing said second signal is a pitch rate gyro.

18. An aircraft instrument comprising: means for providing a first signal in accordance with forward acceleration of the aircraft; means for providing a second signal in accordance with rate of change of pitch attitude of the aircraft; means for providing a third signal in accordance with the extent to which change in pitch attitude of the aircraft differs from a predetermined value; summing means responsive to the first and third signals to provide a fourth signal in accordance with the algebraic sum of at least two terms, a first of the two terms being proportional to said forward acceleration and the second of the two terms being proportional to the extent to which the change in pitch attitude differs from said predetermined value; and means for providing a measure of difference between said second and fourth signals.

19. An aircraft instrument according to claim 18 wherein said summing means is operative to provide said fourth signal in accordance with said sum as limited in value to a predetermined upper limit.

References Cited

UNITED STATES PATENTS

| | | | |
|---|---|---|---|
| 3,200,642 | 8/1965 | Neuendorf et al. | 73—170 |
| 3,283,573 | 11/1966 | Bishop et al. | 73—178 |
| 3,321,967 | 5/1967 | Kendall et al. | 73—178 |

LOUIS R. PRINCE, *Primary Examiner.*

D. D. WOODIEL, *Assistant Examiner.*